United States Patent [19]
Hori

[11] Patent Number: 5,666,166
[45] Date of Patent: Sep. 9, 1997

[54] METHOD FOR CONVERTING PROGRESSIVE SCAN SIGNALS AND CONVERTER THEREOF

[75] Inventor: Akihiro Hori, Tokyo, Japan

[73] Assignee: Nippon Television Network Corporation, Tokyo, Japan

[21] Appl. No.: 577,905

[22] Filed: Dec. 4, 1995

[51] Int. Cl.$^6$ ................................................. H04N 7/01
[52] U.S. Cl. ........................................... 348/453; 348/441
[58] Field of Search ................................. 348/441, 453, 348/450, 446; 345/153–155; H04N 7/01

[56] References Cited

U.S. PATENT DOCUMENTS

| | | | |
|---|---|---|---|
| 5,333,014 | 7/1994 | Drewery et al. | 348/453 |
| 5,457,498 | 10/1995 | Hori et al. | 348/446 |
| 5,604,540 | 2/1997 | Howe | 348/405 |

Primary Examiner—Victor R. Kostak

[57] ABSTRACT

A converter comprising an input terminal 1 for receiving a chrominance signal of 4:2:2P format progressive scan signal, a low pass filter 2 for passing low frequency component contained in the chrominance signal input to the input terminal 1, high pass filter 3 for passing high frequency component contained in the chrominance signal input to the input terminal 1, a detection means 4 for detecting the high frequency component level of the chrominance signal filtered with the high pass filter 3, a sub-sampling means 6 for sub-sampling the chrominance signal and converting the sub-sampled signal into a chrominance signal of 4:2:2P format progressive scan signal and a switch 5 for connecting the low pass filter 2 and the sub-sampling means 6 to input the low pass filtered chrominance signal to the sub-sampling means 6 when the high frequency component level is detected to be a predetermined level or higher, and for connecting the input terminal 1 and the sub-sampling means 6 to input the chrominance signal input to the input terminal 1 to the sub-sampling means 6 when the high frequency component level is detected to be lower than the predetermined level.

11 Claims, 3 Drawing Sheets

LOW PASS FILTER 2

HIGH PASS FILTER 3

METHOD FOR CONVERTING PROGRESSIVE SCAN SIGNALS AND CONVERTER THEREOF

BACKGROUND OF THE INVENTION

This invention relates to an art for converting progressive scan signals and, more particularly, to the art for sub-sampling chrominance signals of the progressive scan signal of 4:2:2P format (4:luminance, 2:chrominance or previously called 8:4:4, 8:luminance signal, 4:chrominance signal) for conversion into chrominance signals of the progressive scan signal of 4:2:0P format (or previously called 8:2:2, 8:luminance signal, 2:chrominance signal; it is also called as 4:2:2:4 format).

Aiming for satisfying needs for improving picture quality, various types of standards on high picture quality TV have been proposed. Among those standards, Enhanced TV in Japan (referred to as EDTV-II, hereinafter) has been highly expected as a target for practical implementation. For this, diversified developments have been on the progress.

Two formats of progressive scan signals have been proposed for the 525-line progressive scan signal. One is the progressive scan signal of 4:2:2P format for sub-sampling the luminance signal at 27 MHz and the chrominance signal at 13.5 MHz. The other is the progressive scan signal of 4:2:0P format for sub-sampling chrominance signals of 4:2:2P format vertically by half at a half sub-sampling rate, i.e., 6.75 MHz. The aforementioned progressive scan signals of 4:2:0P format is also called as 4:2:2:4 format, which has been disclosed in Japanese Patent Laid Open 46627 (1995) in detail.

At present a studio has generally employed two types of video equipment suitable for the use in either the 4:2:2P format or the 4:2:0P format.

In order to use those differently formatted units efficiently, a conversion technique between 4:2:2P format and 4:2:0P format has to be established.

In order to convert the 4:2:2P format into the 4:2:0P format, chrominance signals of the 4:2:2P format progressive scan signal are vertically sub-sampled by half. However vertical band-limitation prior to the sub-sampling is necessary to cope with aliasing caused by the vertical sub-sampling. The vertical band-limitation is done by low pass filtering the chrominance signals of the 4:2:2P format progressive scan signal in vertical direction. Contrary to this, conversion of the 4:2:0P format into the 4:2:2P format requires interpolation of the chrominance signal.

In the studio, the system is likely to repeat the conversion from the 4:2:2P format to the 4:2:0P format or vice versa several times.

In case of converting the 4:2:2P format into the 4:2:0P format, the vertical band-limitation should be executed only once before sub-sampling. From the second conversion onward, sub-sampling is only required because limiting the bandwidth at every sub-sampling may result in the signal attenuation, leading to troubles.

In order to solve the aforementioned problem, it has been proposed that an operator makes sure at every conversion if the signal is a band-limited signal or not. If it is confirmed that the signal has been bandwidth limited, the signal will be sub-sampled without filtering. This method is rather impractical because it is impossible to distinguish the exact signal from many other video signals processed in the same studio.

Another method has been proposed to insert identification information indicative of band-limitation into the signal. Detecting this identification information identifies the signal for sub-sampling without filtering.

This method calls for a certain standard specifying the position where such identification information should locate within the signal, requiring much time and labor.

SUMMARY OF THE INVENTION

It is an object of the present invention to provide solutions for the aforementioned problems.

It is another object of the present invention to provide an art for converting 4:2:2P format progressive scan signal into 4:2:0P format progressive scan signals accompanied with no attenuation irrespective of repetitive conversion from the 4:2:2P format to the 4:2:0P format or vice versa.

The object of the present invention is achieved by a method for converting a progressive scan signal, wherein a chrominance signal of 4:2:2P format progressive scan signal is converted into a chrominance signal of 4:2:0P format progressive scan signal, the method comprising steps of: receiving a chrominance signal of 4:2:2P format progressive scan signal; filtering the input chrominance signal with a low pass filter; filtering the input chrominance signal with a high pass filter; detecting a high frequency component level of the chrominance signal which has been filtered with the high pass filter; and sub-sampling a chrominance signal which has been filtered with the low pass filter and converting the sub-sampled signal into a chrominance signal of 4:2:0P format progressive scan signal when the detection means determines that the high frequency component level is not lower than a predetermined level, and sub-sampling the whole chrominance signals which have been input and converting the sub-sampled signals into chrominance signals of 4:2:0P format progressive scan signal when the high frequency component level is less than the predetermined level.

The object of the present invention is further achieved by a converter for converting a progressive scan signal, wherein a chrominance signal of 4:2:2P format progressive scan signal is converted into a chrominance signal of 4:2:0P format progressive scan signal, the converter comprising: an input terminal for receiving a chrominance signal of 4:2:2P format progressive scan signal; a low pass filter for filtering a low frequency component of the chrominance signal which has been input to the input terminal; a high pass filter for filtering a high frequency component of the chrominance signal which has been input to the input terminal; a detection means for detecting a high frequency component level of a chrominance signal which has been filtered with the high pass filter; a sub-sampling means for sub-sampling a chrominance signal of the input 4:2:2P format progressive scan signal and converting the sub-sampled signal into a chrominance signal of 4:2:0P format progressive scan signals; and a switch for connecting the low pass filter to the sub-sampling means and inputting a chrominance signal which has been filtered with the low pass filter to the sub-sampling means when the detection means determines that the high frequency component level is not lower than the predetermined level, and for connecting the input terminal to the sub-sampling means and inputting the chrominance signal which has been input to the input terminal to the sub-sampling means when the detection means determines that the high frequency component level is lower than the predetermined level.

It is preferable-that the high pass filter has a symmetry characteristic to that of the low pass filter for simplifying the converter construction. Especially the low pass filter is formed as a digital filter having filter coefficients of ¼, ½ and ¼. While the high pass filter is formed as a digital filter having filter coefficients of −¼, ½ and −¼.

Preferably the above-mentioned converter is further provided with a delay means for delaying the 4:2:2P format progressive scan signal which has been input to the input terminal so as to be adjusted to delay amount of outputs from the low pass filter. Assuming that the low pass filter is a symmetric filter, the delay means is preferably so constructed to adjust delay amount to that of a center of the symmetric filter.

The predetermined level is preferably set to 6 assuming that the high frequency component of the output signal of the high pass filter is 8 bit data, a white peak level is 255 and a black peak level is 0.

The present invention functions in detecting the high frequency component level after high pass filtering the chrominance signal of the input 4:2:2P format progressive scan signals.

If the high frequency component level is equal to or higher than the predetermined level, it is determined to have a large part of high frequency component in vertical direction, which may cause aliasing caused by sub-sampling without applying a low pass filter. Therefore chrominance signals which have been bandwidth limited through the low pass filter are only sub-sampled for conversion into the chrominance signals of 4:2:0P format progressive scan signals.

While if the high frequency component level is lower than the predetermined level, it is determined to have been already bandwidth limited or it has no high frequency component in the original signal. Therefore the whole chrominance signals of the input 4:2:2P format progressive scan signal are sub-sampled for conversion into the chrominance signals of 4:2:0P format progressive scan signals without causing alias.

In the present invention, when converting the 4:2:2P format into the 4:2:0P format by sub-sampling chrominance signals of the 4:2:2P format progressive scan signal, the high pass filtered signal level is detected. Then a large part of vertical high frequency component is only low pass filtered for band-limitation. The signals which have been already bandwidth limited or those supplied from the picture image containing vertical high frequency component are not low pass filtered. Thus the chrominance signal is not excessively filtered irrespective of repetitive conversions between the 4:2:2P format and 4:2:0P format.

The level detection can be done without affecting the vertical low frequency component of the chrominance signal, resulting in successful conversion accompanied with no degradation of the chrominance signal.

The above-constructed present invention requires nobody to make sure if the signal has been bandwidth limited or not in advance of every sub-sampling. The present invention also requires no specific. identification information for identifying the bandwidth limited signal, which allows for easy detection.

As a result, the present invention can be simply constructed and enables to sub-sample the chrominance signal of the 4:2:2P format progressive scan signal accompanied with no signal degradation for conversion into the 4:2:0P format progressive signal requiring less time and labor.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

Figure 1:
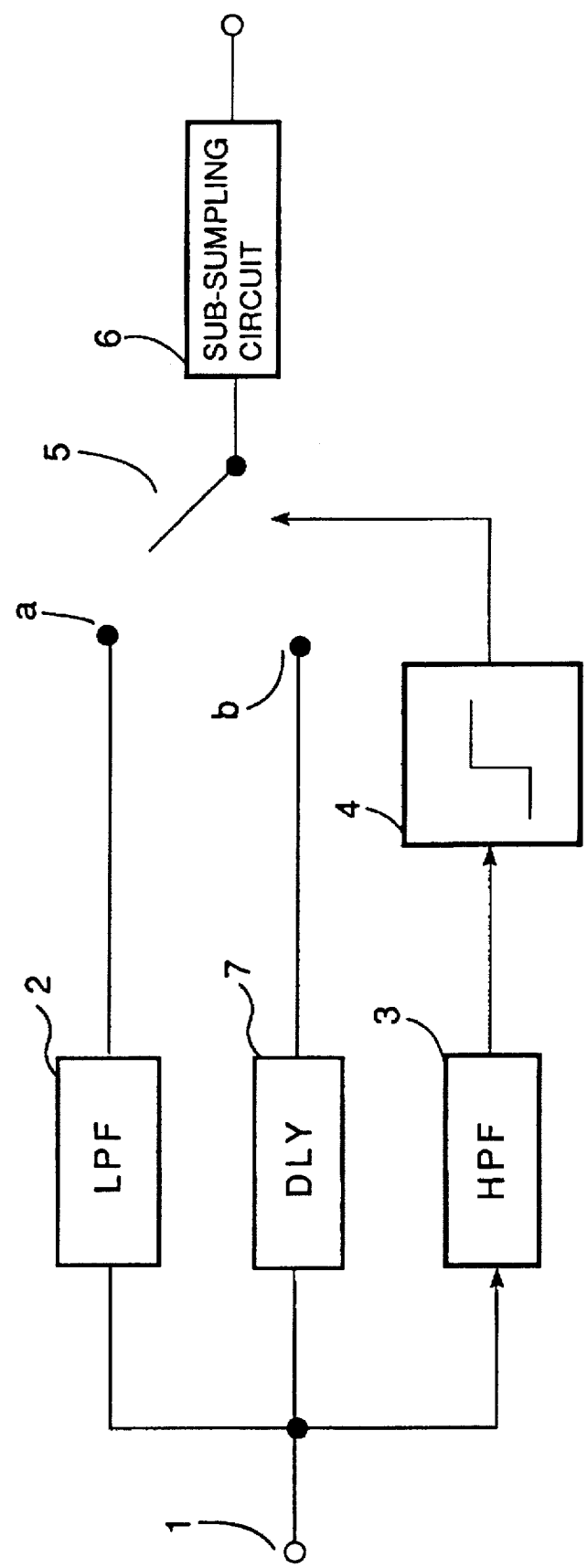
FIG. 1 is a block diagram of an embodiment of the present invention.

An embodiment of the present invention is described referring to the drawings.

FIG. 1 is a block diagram depicting a concept of the embodiment of the present invention.

A reference numeral 1 is an input terminal for receiving a chrominance signal of 4:2:2P format progressive scan signal. A reference numeral 2 is a low pass filter formed as a digital filter connected to the input terminal 1 having coefficients of ¼, ½ and ¼.

A reference numeral 3 is a high pass filter formed as a digital filter connected to the input terminal 1 having coefficients of −¼, ½ and −¼.

Figure 2:
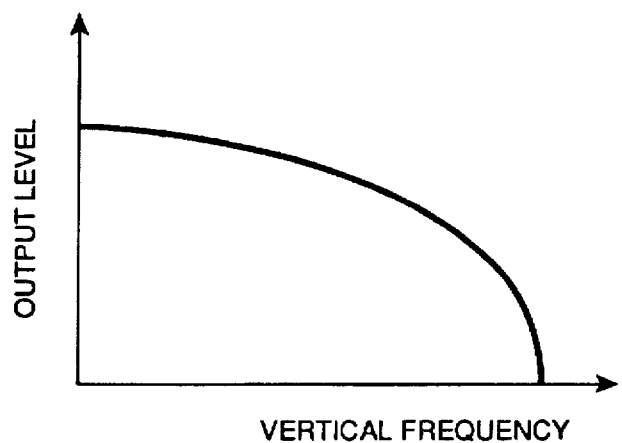
FIG. 2 is a graphical representation showing a characteristic of a low pass filter of the present invention.
Figure 3:
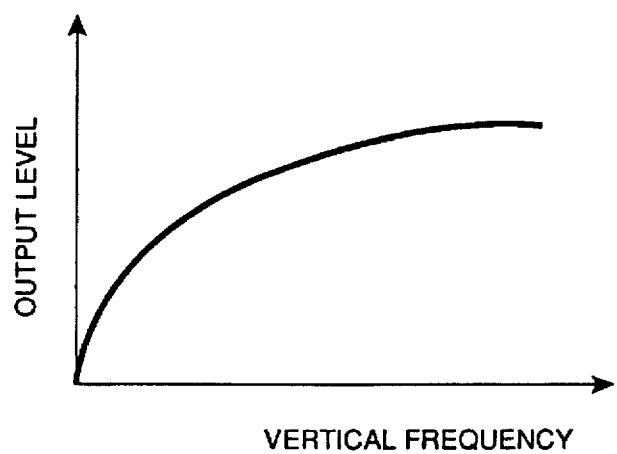
FIG. 3 is a graphical representation showing a characteristic of a high pass filter of the present invention.

Referring to FIGS. 2 and 3, the low pass filter 2 and the high pass filter 3 have a symmetry characteristic with each other. The low pass filter 2 and the high pass filter 3 are realized through the circuit diagram shown in FIG. 4.

Figure 4:
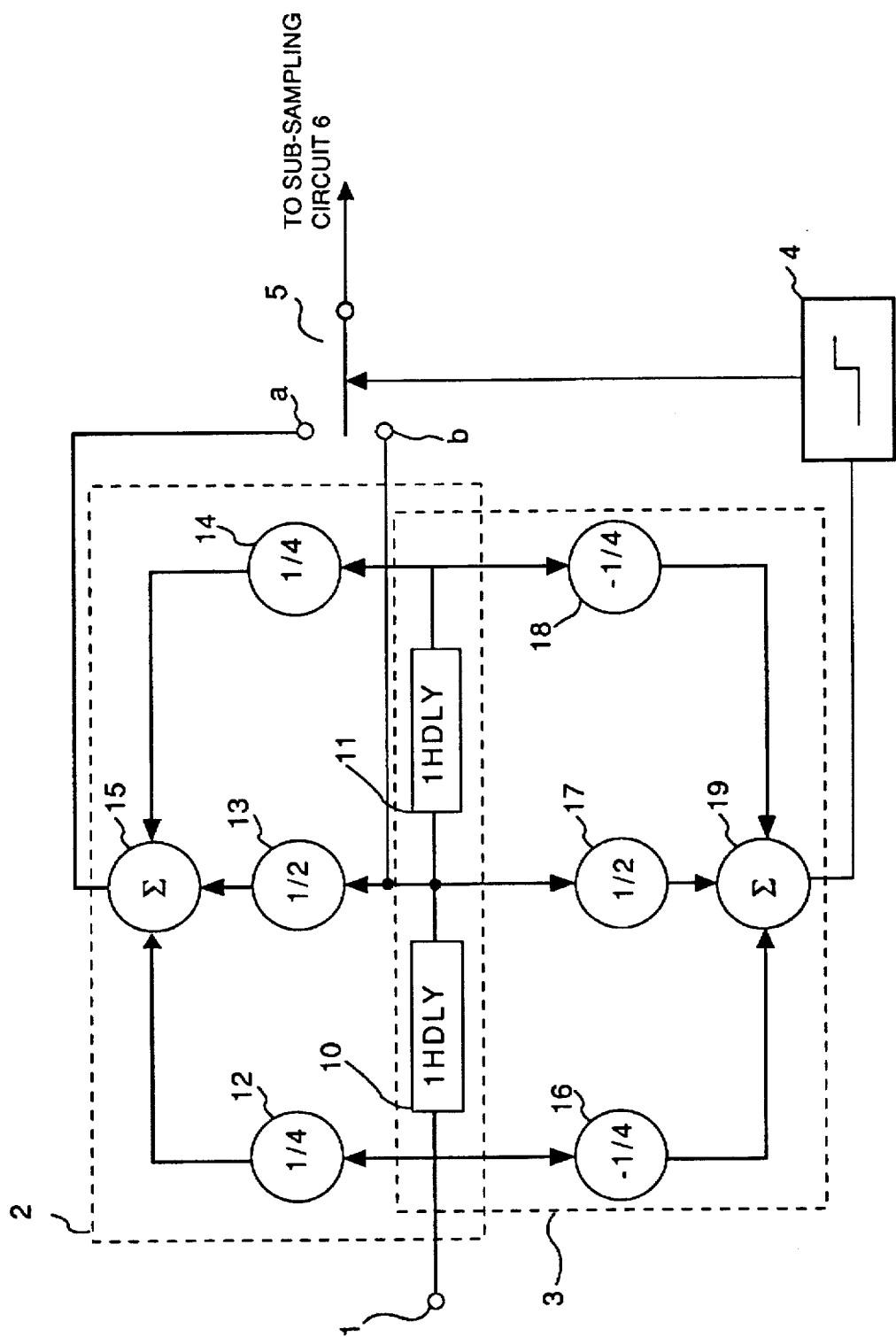
FIG. 4 is a circuit diagram showing an important section of the block diagram of the FIG. 1 in detail.

In FIG. 4, reference numerals 10 and 11 are delay circuits for delaying the input signal by 1 H (1.001/31.5 ms) of the 525 progressive scan signal. Reference numerals 12, 13 and 14 are multipliers and encircled numbers designate coefficients of the low pass filter 2. A reference numeral 15 is a first adder. The low pass filter 2 comprises the delay circuits 10 and 11, multipliers 12, 13 and 14, and the first adder 15.

Reference numerals 16, 17 and 18 are multipliers and encircled numbers designate coefficients of the high pass filter 3. A reference numeral 19 is a second adder. The high pass filter 3 comprises the delay circuits 10 and 11, multipliers 16, 17 and 18, and the second adder 19.

The delay circuit 10 functions as a delay means 7 for adjusting delay amount of the chrominance signal input from the input terminal 1 to the delay amount of a center of the low pass filter 2.

A reference numeral 4 is a detection circuit for detecting the high frequency component level of the output signal of the high pass filter 3. Since the output signal of the high pass filter 3 forms an alternating component, the absolute value of the output signal is used for determination. Assuming that the high frequency component level is 8 bit data, the white peak level is 255 and the black peak level is 0, if the absolute value of the determined level is equal to or higher than 6, i.e., the absolute value of the output signal is equal to or more than 6/255, "1" is output to a switch circuit 5 described later. If the absolute value of the determined level is lower than 6, i.e., the absolute value of the output signal is less than 6/255, "0" is output to the switch circuit 5.

The reference numeral 5 is a switch circuit for switching the contact to "a" or "b" alternatively upon receiving the output from the detection circuit 4. When the detection circuit 4 outputs "1", i.e., the absolute value of the high frequency component level is 6 or higher, the switch circuit 5 is constructed to switch the contact to "a" for inputting the output signal of the low pass filter 2 to a sub-sampling circuit 6. When the detection circuit 4 outputs "0", i.e., the absolute value of the high frequency component level is less than 6, the switch circuit 5 is constructed to switch the contact to "b" for inputting the input signal from the input terminal 1 to the sub-sampling circuit 6.

A reference numeral 6 is the sub-sampling circuit which is designed to sub-sample chrominance signals of the 4:2:2P format progressive scan signal vertically by half.

Next, an operation of the above-constructed converter is described.

The chrominance signal of the 4:2:2P format progressive scan signal from the input terminal 1 is branched and input to the low pass filter 2 and the high pass filter 3, respectively.

The low pass filter 2 limits the bandwidth of the chrominance signal of the 4:2:2P format progressive scan signal in vertical direction. While the high pass filter 3 does not pass the vertical low frequency component and passes only high frequency component of the chrominance signal of the 4:2:2P format progressive scan signal.

The output signal of the high pass filter 3 is, then input to the detection circuit 4 where the high frequency component level of the output signal is determined. If an absolute value of the level is detected to be 6 or higher in 8 bit system, the chrominance signal of the 4:2:2P format progressive scan signal input to the input terminal is determined to have not been bandwidth limited yet. Then "1" is output to the switch circuit 5. The switch circuit 5 switches the contact to "a" and inputs an output of the low pass filter 2, i.e., the bandwidth limited chrominance signal, to the sub-sampling circuit 6.

If an absolute value of the level is detected to be less than 6, it is determined that the chrominance signal of the 4:2:2P format progressive scan signal input to the input terminal 1 has been already bandwidth limited or supplied from the picture image containing no vertical high frequency component. As a result, it is determined that no further band-limitation is necessary, then "0" is output to the switch circuit 5. The switch circuit 5 switches the contact to "b" for inputting the signal input to the input terminal 1, i.e., the chrominance signal of the input 4:2:2P format progressive scan signal to the sub-sampling circuit 6.

This switching operation is done dynamically by switch 5 depending upon the chrominance signal. Thus only the part which has high vertical chrominance component is filtered to avoid aliasing of the sub-sampling.

The sub-sampling circuit 6 sub-samples the input chrominance signals by half in vertical direction.

As aforementioned, only a large part of vertical high frequency component contained in the input picture image is filtered for band-limitation prior to sub-sampling. Since the other component part is not filtered, the chrominance signal cannot be excessively filtered irrespective of repetitive conversions between the 4:2:2P and 4:2:0P formats. Or, even in the first conversion, the part which has no vertical low frequency chrominance frequency component has never pass the vertical low pass filter which may affect the pass-band. Because there is no ideal low pass filter which has no attenuation in pass-band.

This embodiment described with respect to a 3-tap filter having coefficients of ¼, -¼, ¾, ¼ and -¼. However it allows to use any other types of low pass filters and high pass filters having various numbers of coefficients and taps.

The predetermined absolute value of level of the output signal of the high pass filter can be set to any desired value other than 6.

The present invention also allows to use the progressive scan signals of such as 625 progressive scanning lines or 750 progressive scan other than 525 scanning lines.

What is claimed is:

1. A method for converting a progressive scan signal, wherein an 4:2:2P (4: luminance signal, 2: chrominance signal) format progressive scan signal is converted into an 4:2:0P (4: luminance signal; 2: chrominance signal) format progressive scan signal, said method comprising steps of:

receiving a chrominance signal of said 4:2:2P format progressive scan signal;

filtering said chrominance signal with a low pass filter;

filtering said chrominance signal with a high pass filter;

detecting a high frequency component level of said chrominance signal which has been filtered with said high pass filter; and converting a chrominance signal which has been filtered with said low pass filter into a chrominance signal of said 4:2:0P format progressive scan signal by sub-sampling said chrominance signal which has been filtered with said low pass filter when said detection means determines that said high frequency component level is not lower than a predetermined level, and converting a chrominance signal which has been filtered with said low pass filter into a chrominance signal of said 4:2:0P format progressive scan signal by sub-sampling said chrominance signal of said 4:2:2P format progressive scan signal when said high frequency component level is less than said predetermined level.

2. The method for converting progressive scan signal of claim 1, wherein said high pass filter and said low pass filter have a symmetry characteristic with each other.

3. The method of claim 1, wherein said predetermined absolute value level is set to 6 in case of a high pass component of a chrominance signal which has been filtered with said high pass filter being 8 bit data, a white peak level is 255 and a black peak level is 0.

4. A converter for converting a progressive scan signal, wherein an 4:2:2P format progressive scan signal is converted into an 4:2:0P format progressive scan signal, said converter comprising:

an input terminal for receiving a chrominance signal of said 4:2:2P format progressive scan signal;

a low pass filter for passing a low frequency component of said chrominance signal which has been input to said input terminal;

a high pass filter for passing a high frequency component of said chrominance signal which has been input to said input terminal;

a detection means for detecting a high frequency component level of a chrominance signal which has been filtered with said high pass filter;

a sub-sampling means for sub-sampling a chrominance signal of said input 4:2:2P format progressive scan signal; and a switch for connecting said low pass filter to said sub-sampling means and suppling a chrominance signal which has been filtered with said low pass filter to said sub-sampling means when said detection means detects that said high frequency component level is not lower than said predetermined level, and for connecting said input terminal to said sub-sampling means and suppling said chrominance signal which has been input to said input terminal to said sub-sampling means when said detection means detects that said high frequency component level is lower than said predetermined level.

5. The converter of claim 4, wherein said high pass filter has a symmetry characteristic to that of said low pass filter.

6. The converter of claim 5, wherein said low pass filter comprises a digital filter having normalized filter coefficients of ¼, ½ and ¼, and said high pass filter comprises a digital filter having normalized filter coefficients of −¼, ½ and −¼.

7. The converter of claim 4, comprising a delay means for delaying said chrominance signal which have been input to said input terminal so as to be adjusted to a delay amount of output signal of said low pass filter.

8. The converter of claim 7, wherein said delay means is constructed so as to be adjusted to a delay amount of a center of said low pass filter in case of said low pass filter being a symmetric filter.

9. The converter of claim 4, wherein said predetermined level is set to absolute value 6 in case of a high frequency component of an output signal of said high pass filter being 8 bit data, a white peak level is 255 and a black peak level is 0.

10. A converter for converting a progressive scan signal, wherein an 4:2:2P format progressive scan signal is converted into an 4:2:0P format progressive scan signal, said converter comprising:

an input terminal for receiving a chrominance signal of 4:2:2P format progressive scan signal;

a digital low pass filter for passing a low frequency component of said chrominance signal which has been input to said input terminal, and having normalized filter coefficients of ¼, ½ and ¼;

a digital high pass filter for passing high frequency component of said chrominance signal which has been input to said input terminal, and having normalized filter coefficients of −¼, ½ and −¼;

a delay means for delaying said chrominance signal which has been input to said input terminal by delay amount of a center of said low pass filter;

detection means for detecting a high frequency component level of an output signal of said high pass filter;

sub-sampling means for sub-sampling a chrominance signal of input 4:2:2P format progressive scan signal;

a switch for connecting said low pass filter to said sub-sampling means and suppling a chrominance signal which has been filtered with said low pass filter to said sub-sampling means when said detection means detects that said high frequency component level is not lower than said predetermined level, and for connecting said delay means to said sub-sampling means and suppling said chrominance signal output from said delay means to said sub-sampling means when said detection means detects that said high frequency component level is lower than said predetermined level.

11. The converter of claim 10, wherein said predetermined level is set to 6 in case of a high frequency component of an output signal of said high pass filter being 8 bit data, a white peak level is 255 and a black peak level is 0.

* * * * *